(12) United States Patent
Takizawa et al.

(10) Patent No.: US 12,432,769 B2
(45) Date of Patent: Sep. 30, 2025

(54) TRANSMISSION CONTROL METHOD AND INFORMATION PROCESSING APPARATUS

(71) Applicant: TOYOTA JIDOSHA KABUSHIKI KAISHA, Toyota (JP)

(72) Inventors: Kenichi Takizawa, Koganei (JP); Masafumi Moriyama, Koganei (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 391 days.

(21) Appl. No.: 17/936,564

(22) Filed: Sep. 29, 2022

(65) Prior Publication Data

US 2023/0096450 A1 Mar. 30, 2023

(30) Foreign Application Priority Data

Sep. 30, 2021 (JP) ................................. 2021-161548

(51) Int. Cl.
*H04W 72/23* (2023.01)
*H04J 13/10* (2011.01)
(Continued)

(52) U.S. Cl.
CPC ......... *H04W 72/563* (2023.01); *H04L 1/0007* (2013.01); *H04L 1/18* (2013.01); *H04W 52/346* (2013.01); *H04W 72/0473* (2013.01)

(58) Field of Classification Search
CPC . H04W 52/24; H04W 52/325; H04W 52/322; H04B 1/7075; H04B 1/707;
(Continued)

(56) References Cited

U.S. PATENT DOCUMENTS

| 6,567,391 B1 * | 5/2003 | Moon | H04B 1/707 370/335 |
| 6,728,233 B1 * | 4/2004 | Park | H04W 28/18 370/335 |

(Continued)

OTHER PUBLICATIONS

Masafumi Moriyama et al., "Experimental Evaluation of a Novel Up-Link NOMA System for IoT Communication Equipping Repetition Transmission and Receive Diversity", IEICE Trans. Commun., vol. E102-B, No. 8, Aug. 2019, pp. 1467-1476.
(Continued)

*Primary Examiner* — Sai Aung
(74) *Attorney, Agent, or Firm* — Finnegan, Henderson, Farabow, Garrett and Dunner, LLP

(57) ABSTRACT

Provided is a transmission control method for a plurality of transmitting stations which are connected to a wireless communication partner receiving station by non-orthogonal multiple access, and each of which is capable of transmitting a same signal to the receiving station by repetition for a predetermined number of times at a predetermined cycle, wherein an information processing apparatus executes: acquiring information indicating a code word length for each of the plurality of transmitting stations to use for the repetition; and assigning, to each of the plurality of transmitting stations, transmitting power for ensuring a power difference which is required between transmitting stations, so that the shorter the code word length the higher the receiving power at the receiving station.

20 Claims, 14 Drawing Sheets

(51) Int. Cl.
*H04J 13/16* (2011.01)
*H04L 1/00* (2006.01)
*H04L 1/18* (2023.01)
*H04W 52/04* (2009.01)
*H04W 52/34* (2009.01)
*H04W 72/044* (2023.01)
*H04W 72/563* (2023.01)

(58) Field of Classification Search
CPC ......... H04B 7/2628; H04B 1/69; H04J 13/00; H04J 13/10; H04J 13/16; H04J 11/00; H04J 1/16
See application file for complete search history.

(56) References Cited

U.S. PATENT DOCUMENTS

| | | | | |
|---|---|---|---|---|
| 11,677,334 | B2* | 6/2023 | Cai | H02M 7/5395 307/84 |
| 2002/0012332 | A1* | 1/2002 | Tiedemann, Jr. | H04W 28/22 370/335 |
| 2002/0075829 | A1* | 6/2002 | Sakoda | H04W 52/60 370/332 |
| 2002/0082041 | A1* | 6/2002 | Ozluturk | H04B 1/707 375/E1.006 |
| 2003/0112853 | A1* | 6/2003 | Iwamoto | H04W 52/24 375/150 |
| 2004/0062321 | A1* | 4/2004 | Nakamura | H04W 52/325 375/295 |
| 2013/0142102 | A1* | 6/2013 | Polan | H04B 17/318 370/312 |
| 2021/0219246 | A1* | 7/2021 | Xu | H04W 52/146 |
| 2022/0272703 | A1* | 8/2022 | Jin | H04B 7/2041 |

OTHER PUBLICATIONS

3GPP TR 38.830, V17.0.0, Study on NR Coverage Enhancements (Release 17), Dec. 2020.

* cited by examiner

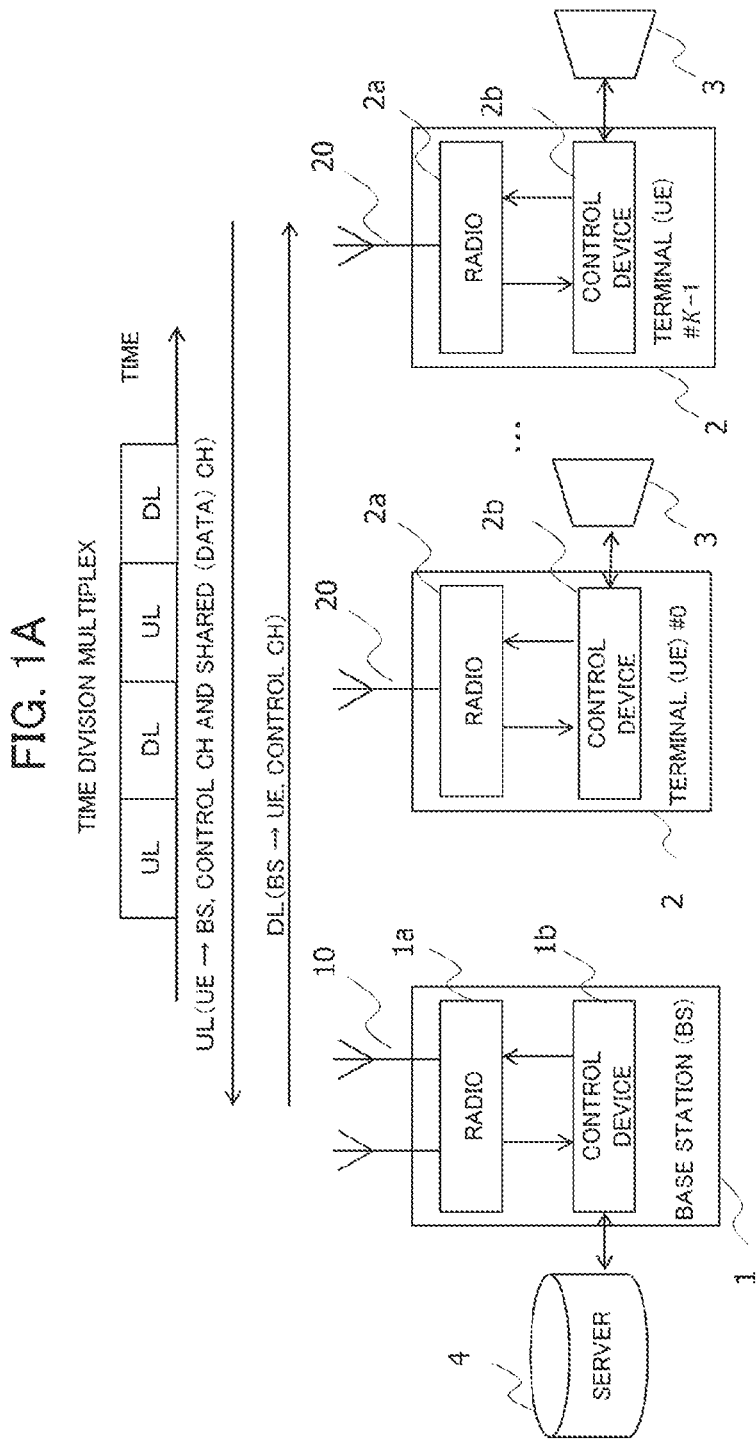

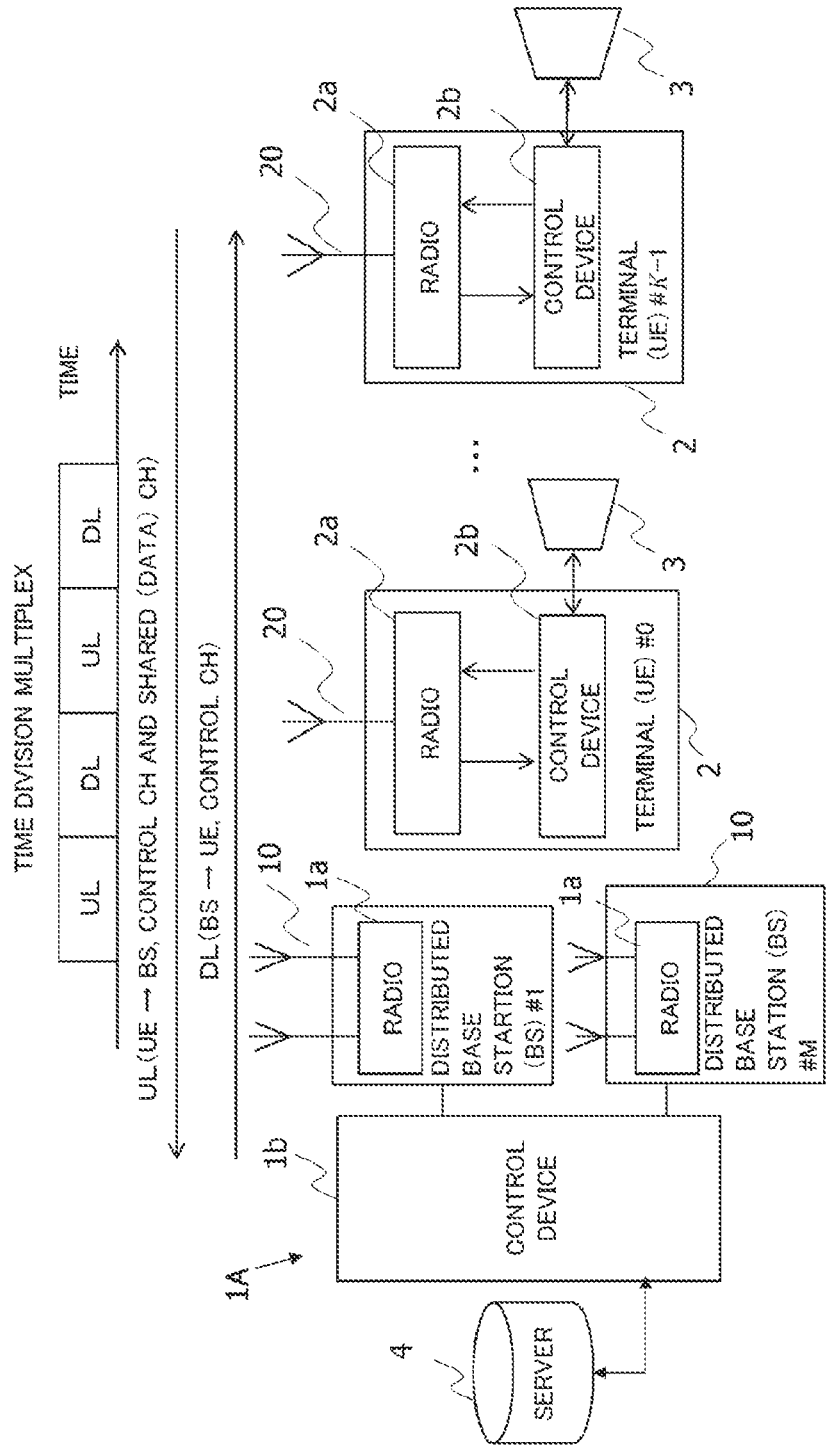

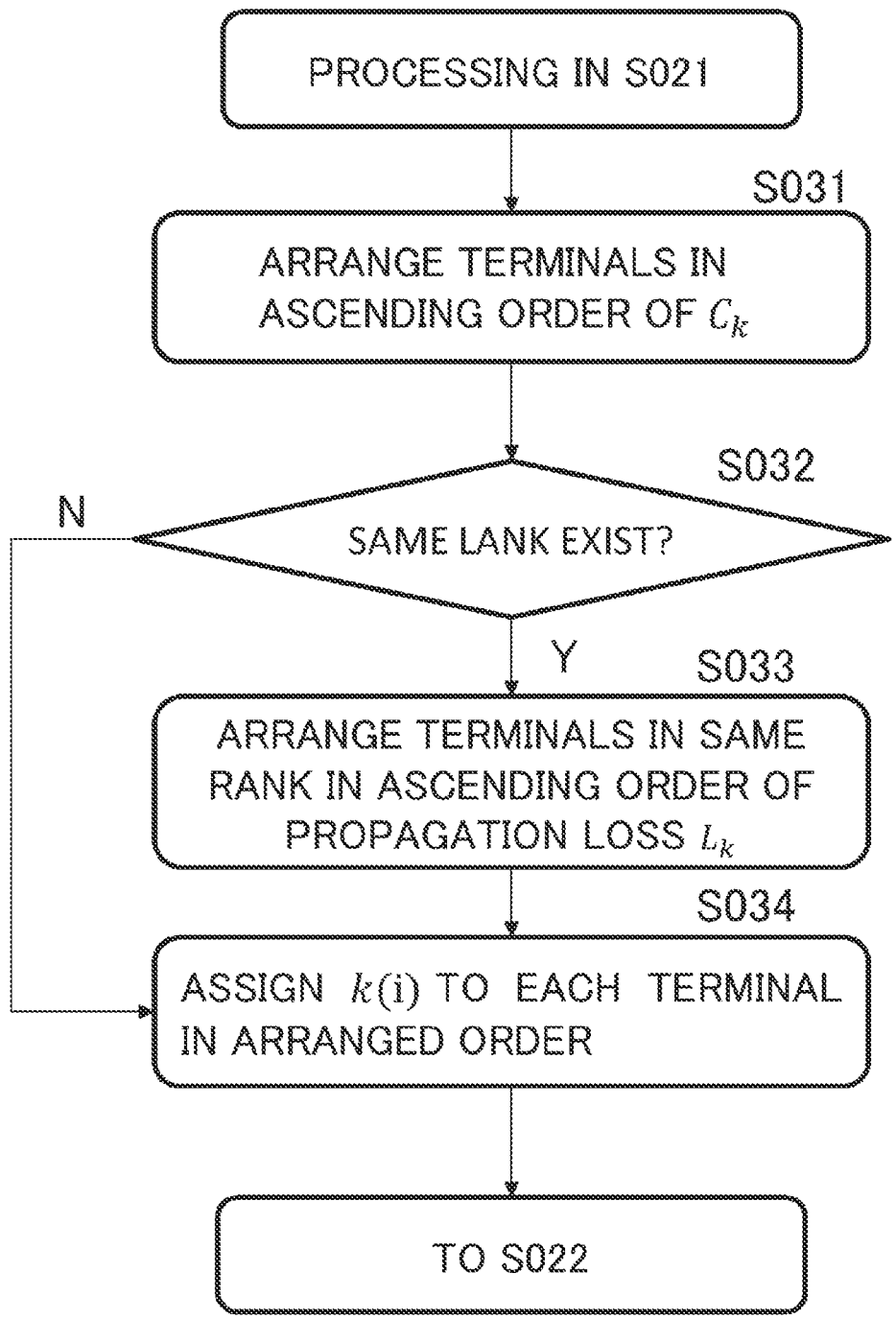

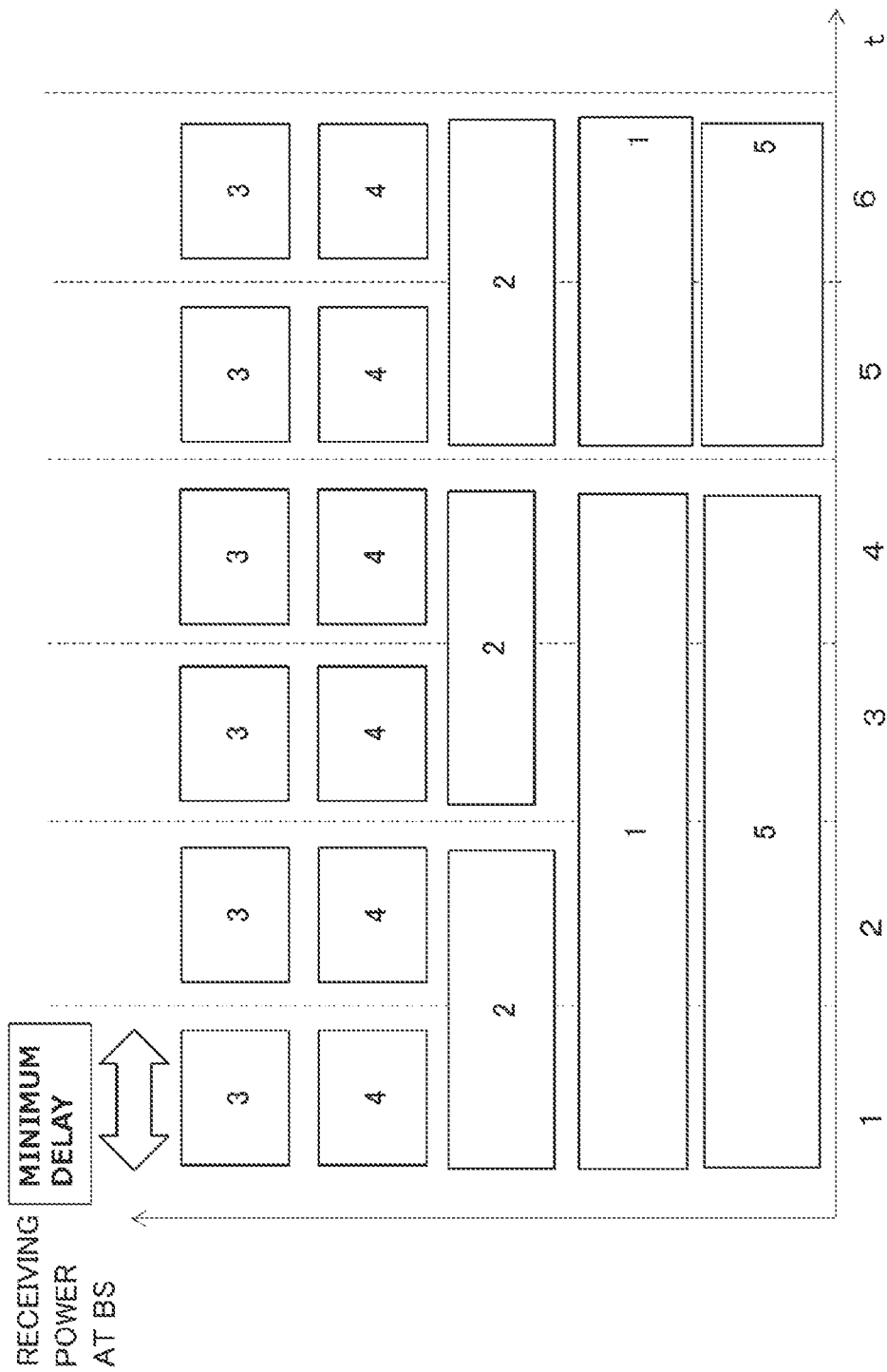

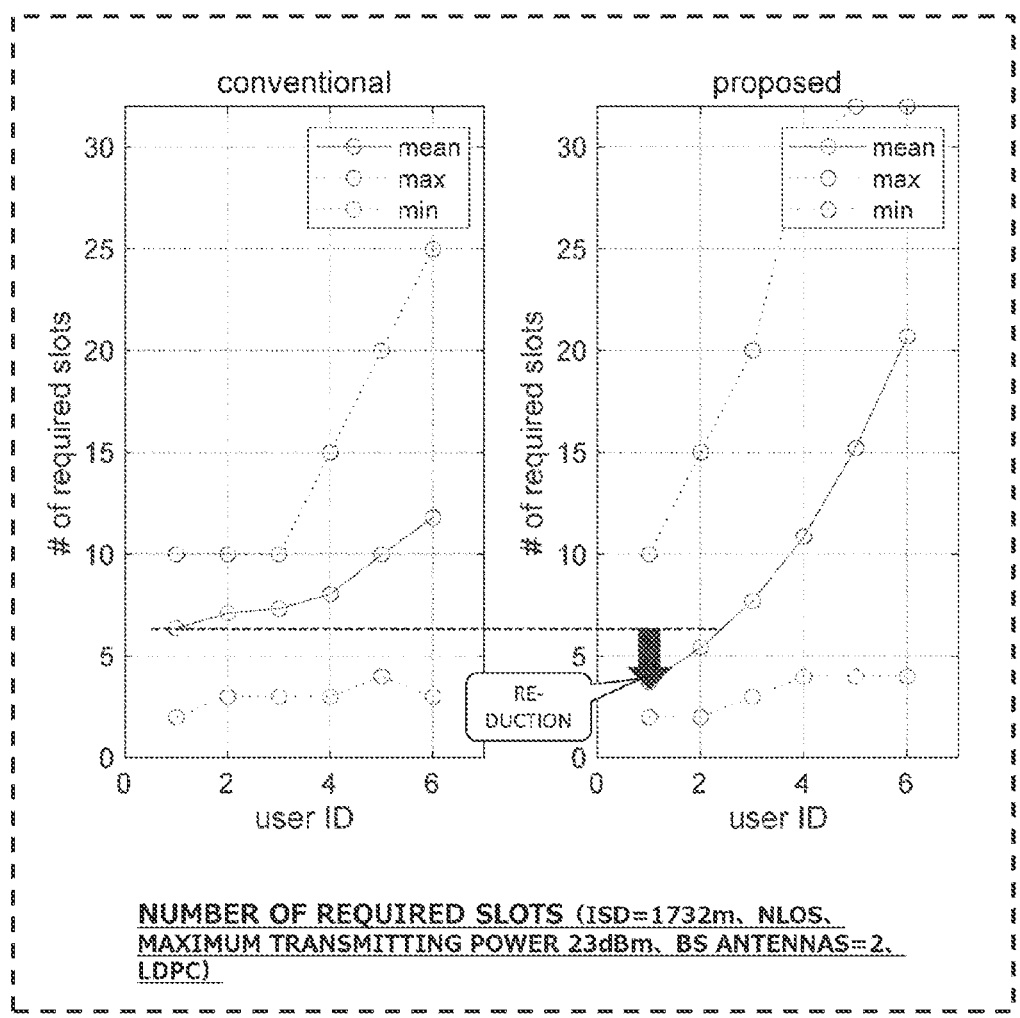

TRANSMISSION CONTROL METHOD AND INFORMATION PROCESSING APPARATUS

CROSS REFERENCE TO THE RELATED APPLICATION

This application claims the benefit of Japanese Patent Application No. 2021-161548, filed on Sep. 30, 2021, which is hereby incorporated by reference herein in its entirety.

BACKGROUND

1. Technical Field

The present disclosure relates to a transmission control method and an information processing apparatus.

2. Description of the Related Art

The Third Generation Partnership Project (3GPP), a standardization organization that standardizes mobile communications, has set the coverage enhancement (the expansion of a communication range) as a subject in Release 17. In conference discussions, a technique to implement communications that satisfy desired communication requirements, regardless of the distance from the base station, was considered, to include cases where the propagation loss between the base station and the terminal is large.

A prior art related to the present disclosure is a technique to improve the signal to noise ratio (SNR) at a receiving station by repeatedly transmitting a same signal, and integrating the same signals at the receiving station (e.g. 3GPP TR 38.830, Study on NR coverage enhancements (Release 17), December 2020). Another prior art is a technique that allows a plurality of terminals, which can perform non-orthogonal multiple access (NOMA) to the base station, to transmit data in a same time zone using a same frequency band (e.g. M. Moriyama, T. Takizawa, M. Oodo, H. Tezuka, and F. Kojima, "Experimental Evaluation of a Novel Uplink NOMA System for IoT communication Equipping Repetition Transmission and Receive Diversity", IEICE Trans. Commun., Vol. E102-B, No. 8, pp. 1467-1476).

SUMMARY

It is an object of the present disclosure to provide a technique that allows a transmitting station, which performs repetitive transmission, to control delays appropriately.

An aspect of the present disclosure is a transmission control method for a plurality of transmitting stations which are connected to a wireless communication partner receiving station by non-orthogonal multiple access, and each of which is capable of transmitting a same signal to the receiving station by repetition for a predetermined number of times at a predetermined cycle, wherein an information processing apparatus executes: acquiring information indicating a code word length for each of the plurality of transmitting stations to use for the repetition; and assigning, to each of the plurality of transmitting stations, transmitting power for ensuring a receiving power difference at the receiving station which is required between transmitting stations, so that the shorter the code word length the higher the receiving power at the receiving station.

Another aspect of the present disclosure is an information processing apparatus, including a controller (control unit), wherein for a plurality of transmitting stations which are connected to a wireless communication partner receiving station by non-orthogonal multiple access, and each of which is capable of transmitting a same signal to the receiving station by repetition for a predetermined number of times at a predetermined cycle, the controller executes: acquiring information indicating a code word length for each of the plurality of transmitting stations to use for the repetition; and assigning, to each of the plurality of transmitting stations, transmitting power for ensuring a receiving power difference at the receiving station which is required between transmitting stations, so that the shorter the code word length the higher the receiving power at the receiving station.

Another aspect of the present disclosure is a transmission control method in a first transmitting station included in a plurality of transmitting stations which are connected to a wireless communication partner receiving station by non-orthogonal multiple access, and each of which is capable of transmitting a same signal to the receiving station by repetition for a predetermined number of times at a predetermined cycle, wherein the first transmitting station executes: transmitting a code word length used for the repetition to the receiving station; receiving information that indicates the transmitting power which is assigned based on the code word length to be used for the repetition; and performing the repetition using the transmitting power.

Other aspect of the present disclosure may include a wireless communication system which includes the above mentioned plurality of transmitting stations and receiving station, a program which causes a computer to operate as the above mentioned transmitting stations, receiving station or information processing apparatus, and a non-transitory storage medium which records the above mentioned program.

According to the present disclosure, good delay control can be performed for transmitting stations which perform the repetition transmission.

BRIEF DESCRIPTION OF THE DRAWINGS

FIG. 1A is a diagram depicting a first configuration example of a wireless communication system;

FIG. 1B is a diagram depicting a second configuration example of the wireless communication system;

FIG. 11 is a flow chart depicting details of step S021 in FIG. 10;

FIG. 12 is a diagram depicting an example of a modified repetition executed in the wireless communication system; and FIG. 13 is a diagram depicting an experiment example related to the repetition.

DESCRIPTION OF THE EMBODIMENTS

Configuration of Wireless Communication System

Figure 2:
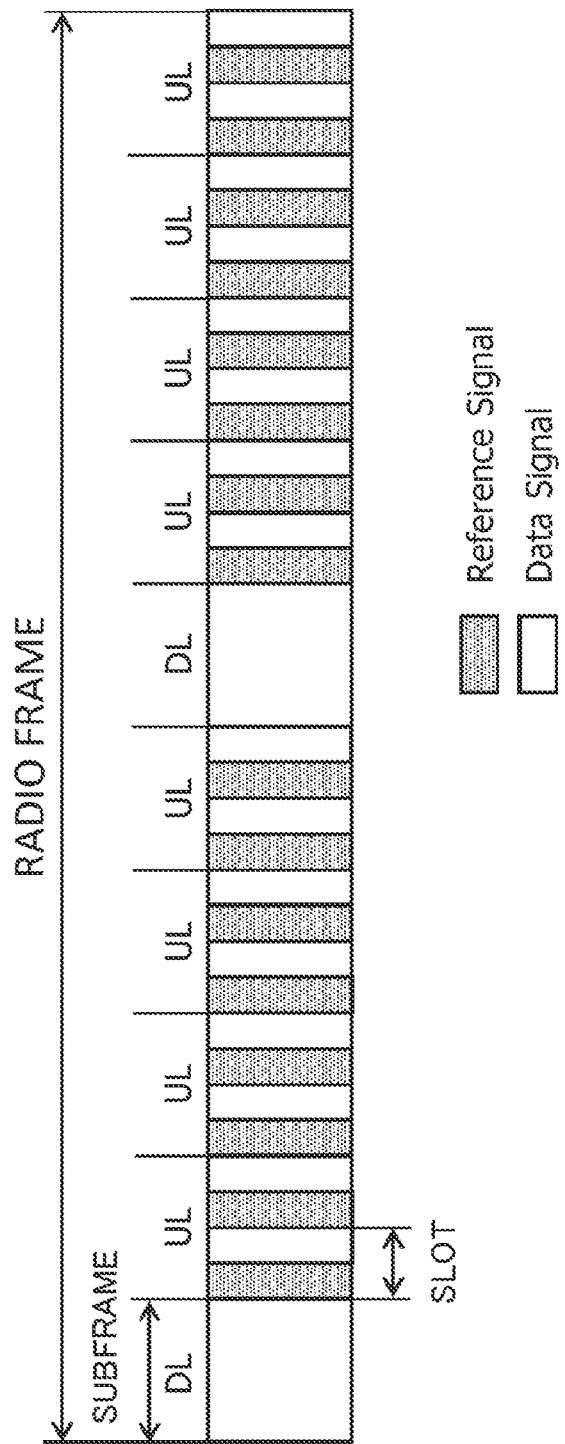
FIG. 2 is a diagram depicting an example of a radio frame (wireless frame) that is applied to the wireless communication system.

FIG. 1A is a diagram depicting a first configuration example of a wireless communication system according to embodiment. FIG. 1B is a diagram depicting a second configuration example of the wireless communication system. The wireless communication system according to the first configuration example includes a base station (BS) 1 and a plurality of terminals 2 (#0 to #K−1, K is a natural number that includes 0), which communicate with the base station 1 wirelessly. The base station 1 is an example of a receiving station, and the plurality of terminals 2 are an example of a plurality of transmitting stations.

Each of the plurality of terminals 2 is called a "user equipment (UE)". Each of the plurality of terminals 2 includes an antenna 20, a radio 2a connected with the antenna 20, and a control device 2b connected with the radio 2a. The control device 2b acquires (receives) data from a sensor 3 or the like. The control device 2b controls the radio 2a to transmit data signals or control signals to the base station 1, or to receive control signals and the like from the base station 1. The radio 2a converts transmission target signals, including the data signals and control signals, into radio signals, and emits (transmits) the radio signals from the antenna 20. The radio 2a also converts the radio signals received from the antenna 20 into signal format, which can be handled by the control device 2b. A number of antennas 20 may be one or two or more. The terminal 2 may have two or more antennas, so that multiple-input and multiple-output (MIMO) communication is performed with the base station 1.

The base station 1 includes one or two or more antennas 10, a radio 1a connected with the antenna 10, and a control device 1b connected with the radio 1a. The radio 1a and the control device 1b have the same functions as the radio 2a and the control device 2b. The control device 2b can transmit data received from the terminal 2 to a server 4 or the like. The control device 1b is an example of an information processing apparatus (computer). The information processing apparatus may be included in the base station 1, or may be a terminal device (e.g. server) that is different from (independent from) the base station 1. In ocher words, such a terminal device as a server may have a function to calculate a number of times of the repetition transmission to the plurality of terminals 2 and the transmitting power that is used for each time, and to notify (transmit) the calculation result to each terminal 2.

According to the wireless communication system, data acquired by each of the plurality of terminals 2 from the sensor 3 (e.g. Internet of Things (IoT) data) can be stored on the server 4 via the base station 1. Further, the data from she server 4 can be transmitted to each of the terminals 2 via the base station 1. The terminal 2 may be a fixed terminal or a mobile terminal. The mobile terminal may be a portable terminal or an onboard terminal. The onboard terminal may be a terminal used inside a vehicle, or a terminal installed in the vehicle.

As the second configuration example in FIG. 1B indicates, a base station 1A, which includes at least two distributed base stations and a control device 1b, may be used instead of the base station 1. A distributed base station includes the antenna 10 and the radio 1a, and is called a "remote radio head (RRH)" (radio unit). The control device 1b, to which at least two distributed base stations are connected, is called a "base band unit (BBU)" (signal processing unit). In the following, the base station 1 having the first configuration example will be described.

In the first and second configuration examples, the base station 1 and each of the plurality of terminals 2 perform communication (transmission/reception of signals) using a downlink (DL) and an uplink (UL). DL is a line from the base station 1 to the terminal 2, and includes a control channel (control CH) that is used for transmission (notification) of the control signals UL, on the other hand, is a line from the terminal 2 to the base station 1, and includes the control CH and a shared channel (shared CH) that is used for transmission of data (user data). The shared CH is also called a "data channel".

Wireless Frame

UL signals and DL signals are transmitted using a time domain assigned by the time division multiplexing. FIG. 2 is a diagram depicting an example of a radio frame that is applied to the wireless communication system. In FIG. 2, the radio frame has a predetermined duration. The radio frame length is 10 ms in 5G, but may be shorter or longer than 10 ms. The radio frame is divided into a plurality of multiple sub-frames. In 5G, the sub-frame length is specified to 1 ms, and one radio frame is divided into 10 sub-frames. The sub-frame length and the number of divisions, however, are not limited to the example in 5G. One sub-frame may be further divided into two or more slots (slot length: 500 μm). As indicated in FIG. 2, each sub-frame of the radio frame is assigned to DL or UL. In the example in FIG. 2, DL and UL are assigned such that four ULs continue after one DL. This assignment, however, is changeable. A slot in a sub-frame assigned to a UL is equally divided, where a reference signal (RS) is mapped to the first half portion, and a data signal (DS) is mapped to the latter half portion. However, the arrangement of the reference signal and the data signal in one slot is changeable as necessary.

The reference signal is a known signal in the receiving station (base station 1), and is used to estimate a channel (called a "propagation path" or a "communication channel") of a wireless signal. The data signal is a signal generated by modulating and encoding the user data in accordance with a predetermined modulation and coding scheme (MCS).

Features of Wireless Communication System

The wireless communication system has the following features in the uplink communication of data signals. The first feature is that in the wireless communication system according to the present embodiment, a configured grant (CG) is used. As indicated in FIG. 2, in the UL communication, the frequency channels and slots that can be used for a CG are notified to the terminal 2 in advance, a different reference signal is provided for each terminal 2, and a CG is implemented by transmitting the reference signal along with the data signal (payload). By using a CG, a communication delay caused by the procedure for the terminal so acquire a grant (communication permission) from the base station can be prevented.

The second feature is that in the wireless communication system, wireless signals (reference signals and data signals) are transmitted from a plurality of terminals 2 using the same frequency domain and the same time domain (slot) based on the non-orthogonal multiple access. In this case, each terminal 2 transmits the wireless signals at a transmitting power specified by the base station 1, so that in the base station 1, a desired receiving power difference is generated between the terminals 2. If NOMA is used, the wait time of signal transmission can be decreased. However, in the base station 1, interference between each terminal 2 need be suppressed and cancelled.

Figure 3:
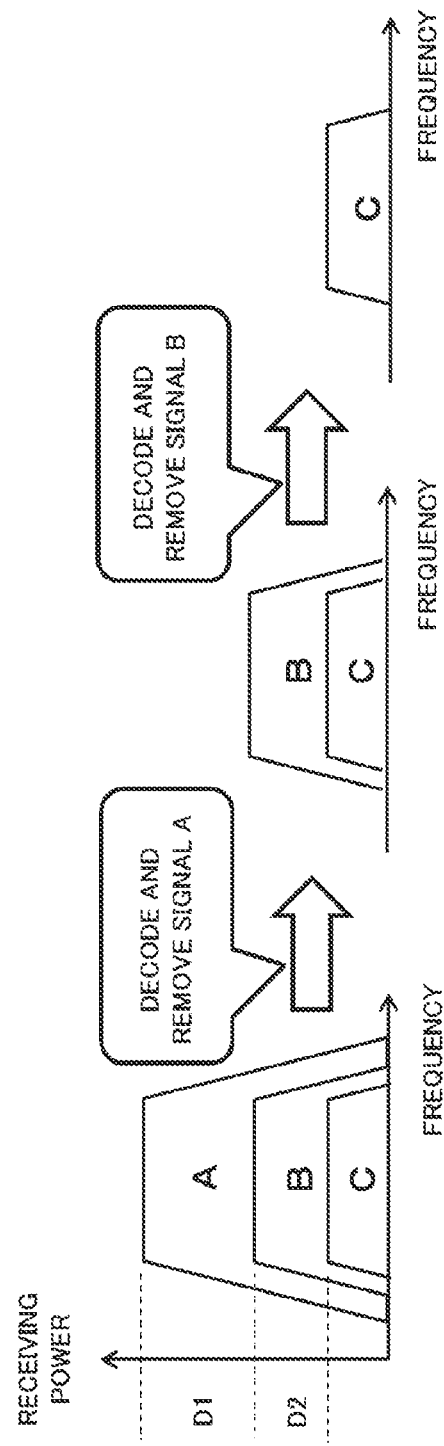
FIG. 3 is an explanatory diagram of power multiplexing, interference suppression and cancellation techniques.

FIG. 3 is an explanatory diagram of power multiplexing and interference suppression and cancellation techniques. In FIG. 3, the diagram on the left schematically indicates the receiving power at the base station 1 of the wireless signals transmitted from terminals A, B and C, which is an example of the plurality of terminals 2. In this example, data signals received from the terminals A, B and C are superimposed with the receiving power at the base station 1 (superimposed signals). The power difference D1 between the receiving power of the terminal A and the receiving power of the terminal B, and the power difference D2 between the receiving power of the terminal B and the receiving power of the terminal C are at least the receiving power difference (required power difference ΔP) between terminals 2 at the base station 1, which is required for appropriate interference suppression and cancellation respectively.

The base station 1 determines the propagation path characteristic based on the reference signal, and performs demodulation and decoding on the superimposed signals using this propagation path characteristic, whereby data from the terminal A can be acquired. The above mentioned wireless communication system, which includes the UL communication using CC and NOMA, and the interference suppression and cancellation techniques (e.g. SIC) is called "simultaneous transmission access boosting low-latency (STABLE)" by the present inventor. The transmission (repetition) control method according to the present invention, however, is also applicable to a wireless communication system to which NOMA other than STABLE is used.

For the algorithm to perform the interference suppression and cancellation of signals from the terminal A from the superimposed signal, the successive interface cancellation (SIC) algorithm is used. SIC is an algorithm that successively determines a signal for each terminal in descending order of the received signal strength indicator (RSSI), and eliminates he signal. The SIC algorithm uses an estimated value of the communication channel. (propagation path) characteristic between a terminal 2, which uses a reference signal unique to the terminal 2, and the base station 1. In other words, in processing with the SIC algorithm, the signal transmitted from a terminal 2 of which received signal strength is highest (terminal A) is reproduced (generated) (this signal is called a "replica signal") using the estimated value of the propagation path characteristic, and this signal is subtracted from the superimposed signal. Thereby the interference by the data signal from the terminal A is cancelled (removed) from the superimposed signal (see the diagram at the center in FIG. 3).

Then demodulation and decoding using the propagation path characteristic, based on the reference signal from the terminal B, are performed on the superimposed signal after the data signal from the terminal A is cancelled, whereby the data from the terminal B can be acquired. Further, a replica signal of the data signal transmitted from the terminal B is generated using the SIC algorithm, and the replica signal is subtracted from the superimposed signal, whereby the interference caused by the data signal from the terminal B is cancelled. (removed), and a data signal transmitted from the terminal C remains (see the diagram at the right in FIG. 3). Then demodulation and decoding using the propagation path characteristic, based on the reference signal from the terminal C, are performed on the above signal, whereby the data from the terminal C can be acquired.

Repetition

In the wireless communication system, each of the plurality of terminals 2 can perform repetition. "Repetition" refers to repeatedly transmitting a same signal successively at a predetermined cycle (e.g. in slot units). A signal transmitted from a terminal 2 by repetition is received and integrated by the base station 1. Adding the received signals by integration improves SNR, and thereby reception quality (SINR or propagation loss) improves.

In some cases during the repetition, the code word length used for generating a data signal (that is, the encoding rate) may be made uniform among the plurality of terminals 2. On the other hand, each of the plurality of terminals 2 may independently determine the code word length to be used, and performs the repetition in a state where different encoding rates coexist. The coexistence of different code word lengths occurs when the MCS to be used is different among the terminals 2, for example.

The repetition is performed to increase the SNR by integrating the signals received by the repetition, and to improve the SINR. For this, in some cases the plurality of terminals 2 may be arranged in ascending order of the propagation loss, and transmitting power is assigned to the plurality of terminals 2 such that the smaller the propagation loss the higher the receiving power at the base station.

Figure 4:
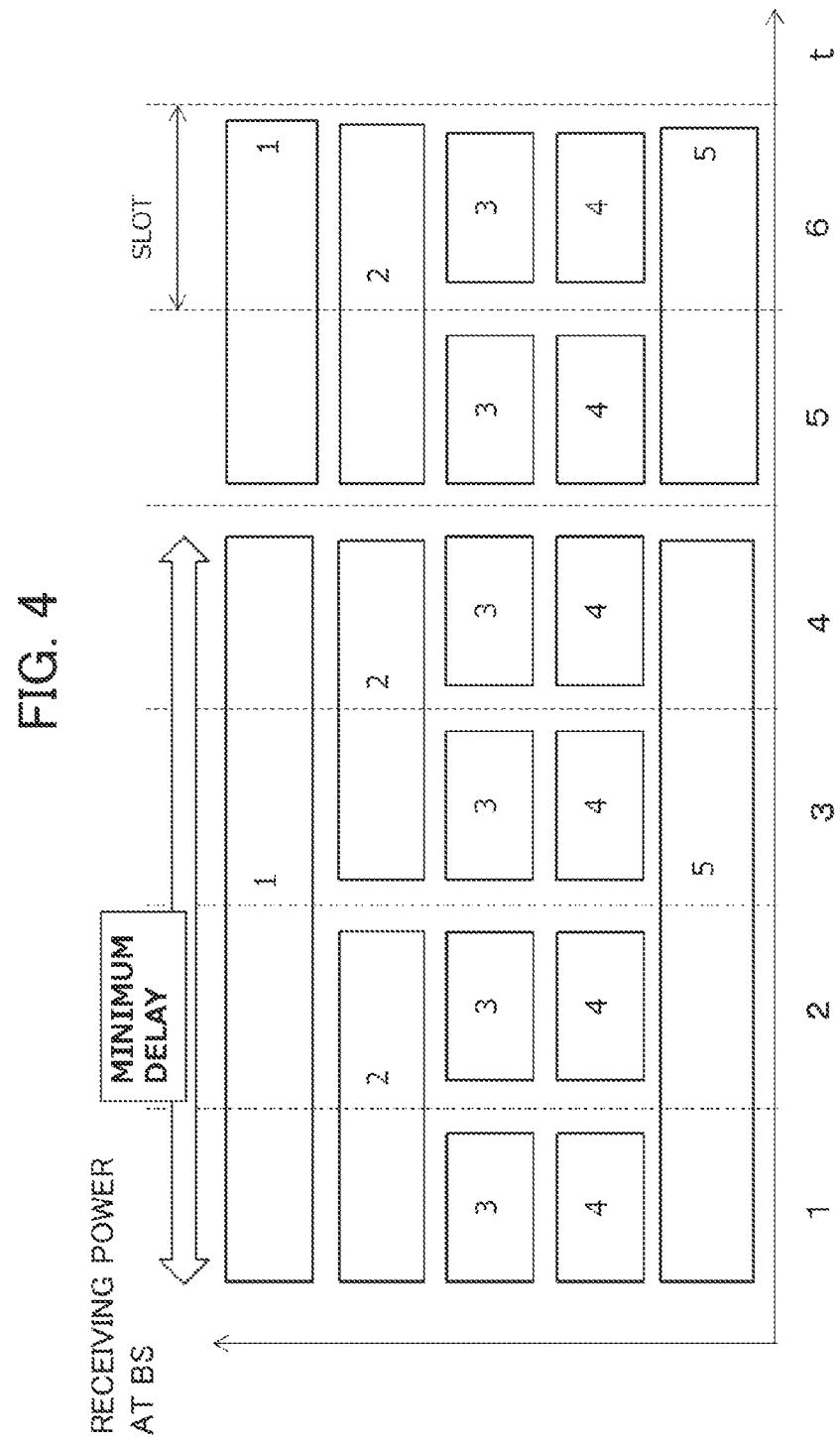
FIG. 4 is a diagram depicting an example of repetition in the wireless communication system.

FIG. 4 is a diagram depicting an example of repetition. In FIG. 4, it is assumed that there are five (K-1=5) terminals 2 that perform the UL communication by NOMA. The identification information (user ID) of each of the five terminals 2 is "1", "2" "3", "4" and "5" respectively. The sequence of the numbers of the terminals "1" to "5" is in descending order of the propagation loss between each terminal and the base station 1. The code word lengths of terminals "1" to "5" are not the same. In the example in FIG. 4, the code word lengths which the terminals "1" and "5" use for repetition are lengths that use four slots to transmit data signals for one cycle of repetition. The code word length which the terminal "2" uses for repetition is a length that uses two slots to transmit data signals for one cycle of repetition. The code word lengths which the terminals "3" and "4" use for repetition are the lengths that use one slot to transmit data signals for one cycle of repetition.

As indicated in FIG. 4, in the case where the code word length of a terminal located at an order lower than terminal "1", of which receiving power at the base station is highest (that is, in the case of the terminals "2", "3" and "4" in the example in FIG. 4), is shorter than the code word length of the terminal "1", the following problem occurs. That is, it takes four slots to receive the data signals from the terminal "1", hence the minimum delay to cancel the signals from the terminal "1" by generating a replica signal of the signal from the terminal "1" using SIC becomes four slots. However, in the reception of the four slots, each of the terminals "2", "3" and "4" has already completed reception to perform normal demodulation and decoding. Nonetheless, the wait time due to the minimum delay is generated for the terminal "1", and a long delay time is generated until the decoding results are received from these terminals. In the following, a wireless communication system and a transmission control method for the transmitting station in which at least the above mentioned problem can be solved will be described.

Hardware Configuration

Figure 5:
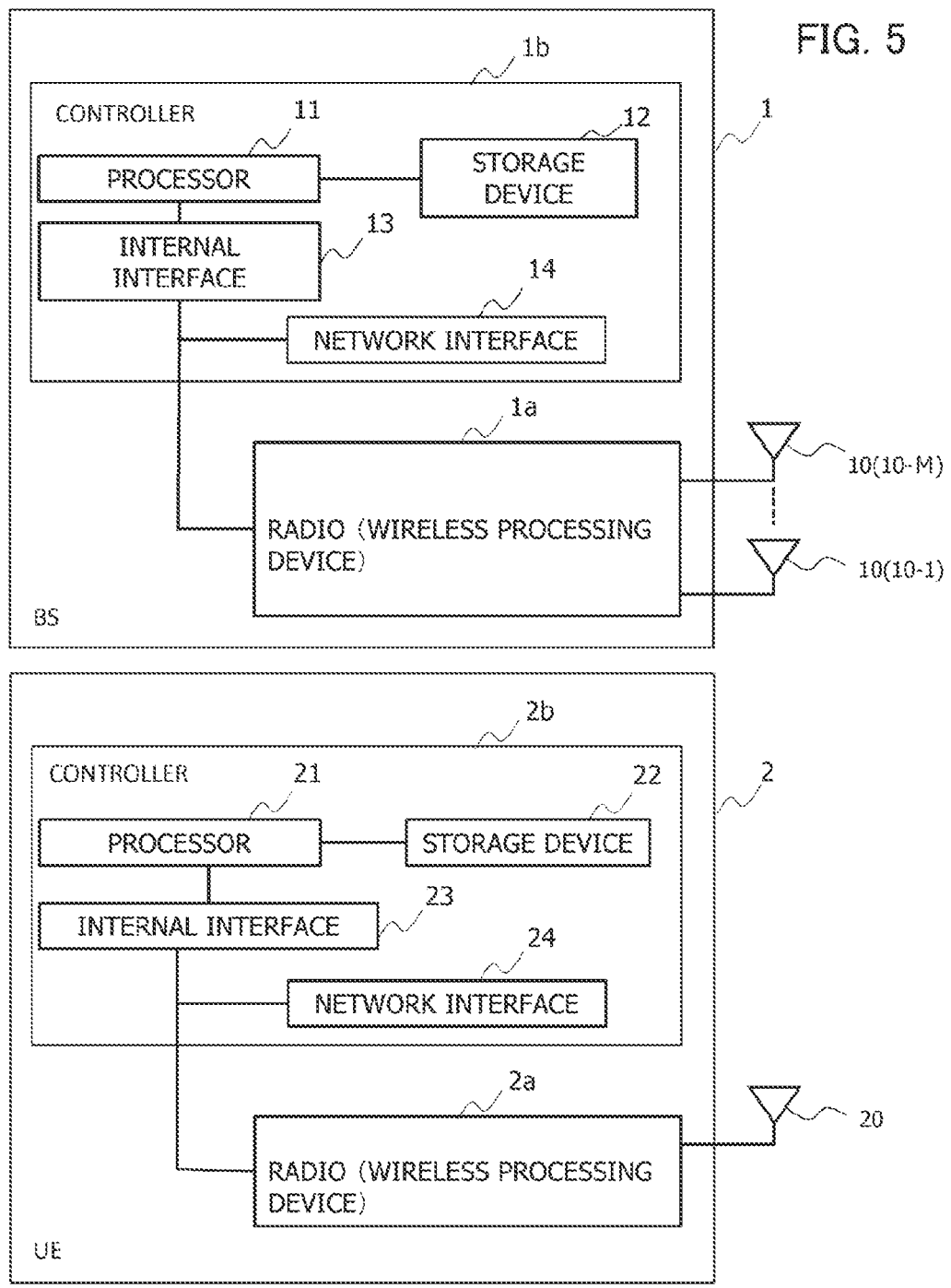
FIG. 5 is a diagram depicting hardware configuration example of a base station and a terminal.

FIG. 5 is a diagram depicting hardware configuration examples of the base station 1 and the terminal 2. In FIG. 5, the base station 1 includes M number of antennas 10 (10-1 to 10-M (M is a natural number)) indicated in FIG. 1A, a radio (wireless processing device) 1a, and a control device 1b. The control device 1b includes a processor 11, a storage device (memory) 12, an internal interface 13, and a network interface 14 to communicate with other base stations and the like.

The processor 11 is also called a "central processing unit (CPU)" or a "microprocessor unit (MPU)". The processor 11 is not limited to a single processor, but may have a multi-processor configuration. In the processor 11, a single physical CPU connected via a single socket may have a multi-core configuration. Further, the processor 11 may include an arithmetic unit having various circuit configurations, such as a digital signal processor (DSP) and a graphics processing unit (CPU). The processor 11 may be linked with an integrated circuit (IC) or other digital circuits or analog circuits. The integrated circuit can be an LSI, an application specific integrated circuit (ASIC), or a programmable logic device (PLD), for example. The PLD is a field programmable gate array (FPGA), for example. The processor 11 may be a micro-computer (MCU), a system-on-a-chip (SoC), a system LSI, or a chip set, for example. The processor 11 is an example of the controller.

The storage device 12 stores an instruction sequence (computer program) executed by the processor 11, data processed by the processor 11, and the like. The internal interface (internal IF) 13 is a circuit to connect various peripheral devices to the processor 11.

The network interface (NW-IF) 14 is a communication device for the base station 1 to access a network to which other base stations are connected. The network to which other base stations are connected is also called a "backhaul". A backhaul is a cable network based on an optical communication.

The radio 1a includes a transmitter that transmits wireless signals and a receiver that receives wireless signals, and is connected to the antennas 10 (10-1, . . . 10-M). The radio 1a may have M number of transmitters and receivers, and the same number of antennas respectively.

In FIG. 5, the terminal 2 includes the antenna 20, the radio (wireless processing device) 2a, and the control device 2b. The control device 2b includes a processor 21, a storage device (memory) 22, an internal interface (internal IF) 23, and a network interface (NW-IF) 24 to communicate with other base stations and the like.

The processor 21, the storage device 22, the internal IF 23, the NW-IF 24 and the radio 2a have the same functions as the processor 11, the storage device 12, the internal IF 13, the NW-IF 14 and the radio 1a respectively.

Configuration of Terminal

Figure 6:
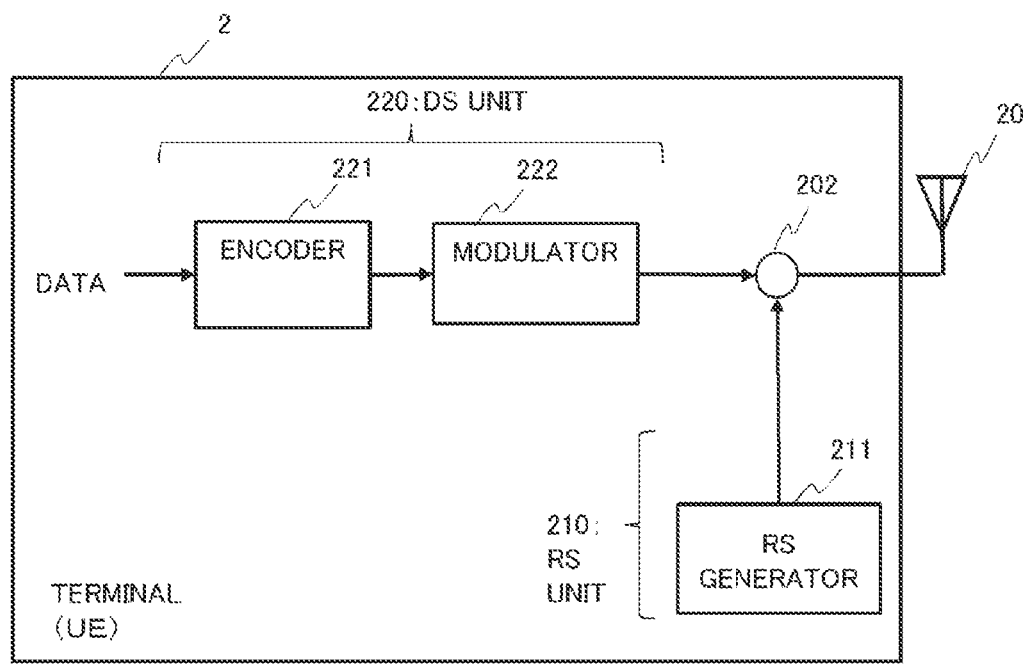
FIG. 6 is a block diagram depicting a configuration example of the terminal.

FIG. 6 is a block diagram depicting a configuration example of the terminal. The terminal 2 operates as a device, including an RS unit 210 and a CS unit 220, by the processor 21 indicated in FIG. 5 executing the programs stored in the storage device 22. The RS unit 210 includes an RS generation unit 211. The RS generation unit 211 generates a reference signal.

The DS unit 220 includes an encoding unit 221 and a modulation unit 222. The encoding unit 221 performs a predetermined error correction encoding for data that is inputted (user data). The error correction encoding is turbo encoding, for example, but may be a different encoding format. Before turbo encoding, a cyclic redundancy check (CRC), for example, may be performed.

The modulation unit 222 generates data signals by performing digital modulation on the encoded data. The digital modulation method is, for example, quadrature amplitude modulation (OAM), phase shift keying (PSK) or the like. The encoding and modulation methods are selected in accordance with the MCS that is set in the terminal 2.

The terminal 2 further includes a multiplexer (multiplexing unit) 202. The output terminal of the multiplexer 202 is connected to the antenna 20. After outputting the reference signal, the multiplexer 202 switches to output the data signal, whereby the reference signal and the data signal for one slot are connected to the antenna 20. In the respective previous stages of the reference signal and the data signal, a signal block, called the "cyclic prefix (CP)", may be set to compensate for the influence of the delay wave. In the case of the repetition, the data signals are generated so that the same data signal is transmitted from the base station 1 for a specified number of repetitions (N times). Alternately, a generated data signal may be reproduced and transmitted for a number of repetitions (N times).

Configuration of Base Station

Figure 7:
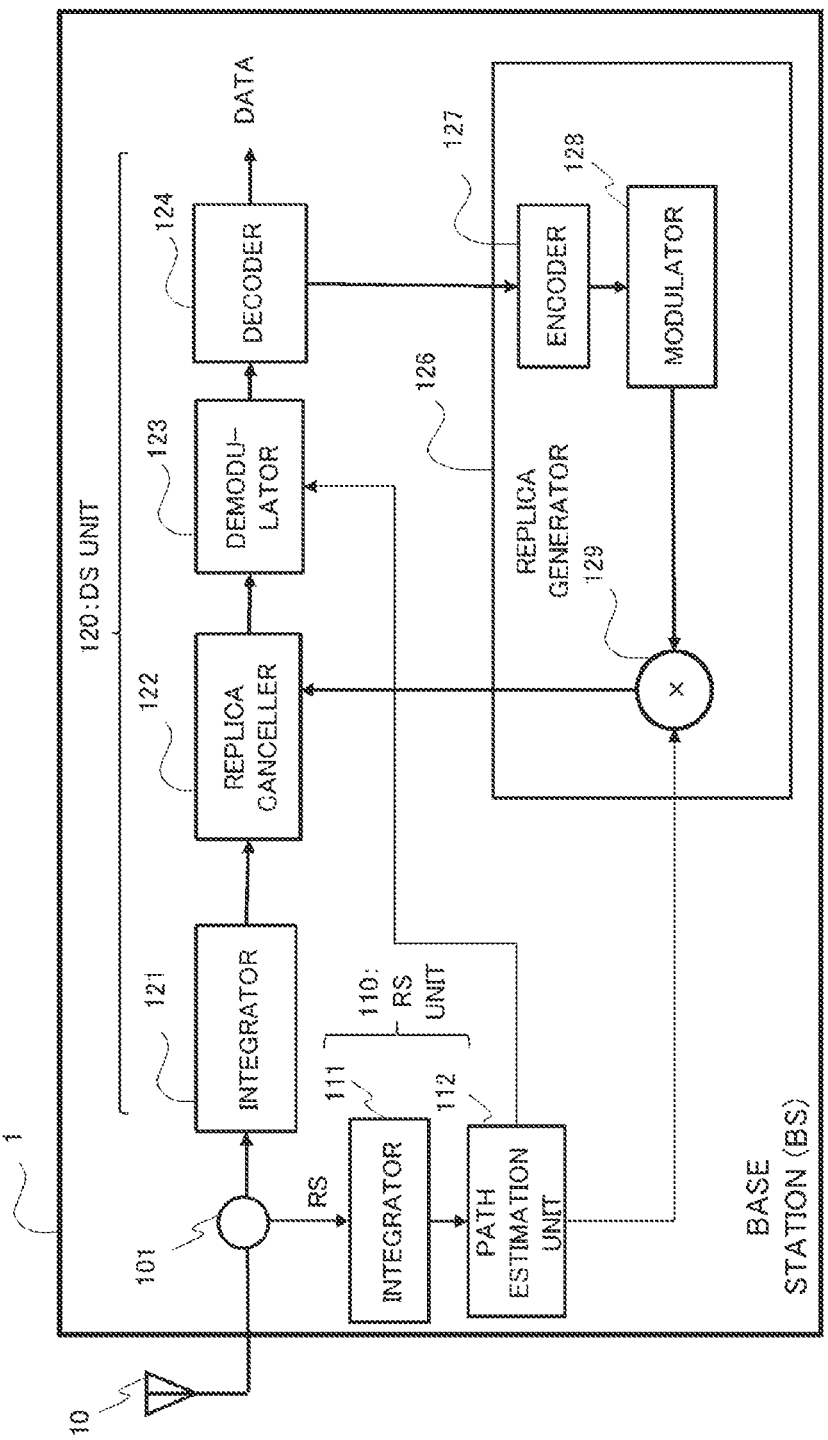
FIG. 7 is a block diagram depicting a configuration example of the base station.

FIG. 7 is a diagram depicting a configuration example of the base station 1. The base station 1 operates as the apparatus having the blocks indicated in FIG. 7 by the processor 11 of the base station 1 executing the programs stored in the storage device 12. As indicated in FIG. 7, the base station 1 includes the antenna 10, a demultiplexer 101, an RS unit 110 and a DS unit 120. Out of the signals received from the antenna 10, the demultiplexer 101, transmits a reference signal to an integration unit (integrator) 111 of the RS unit 110, and transmits a data signal to an integration unit (integrator) 121 of the DS unit 120 by a switch operation. At this time, the CPS attached to the reference signal and the data signal are cancelled.

The integration unit 111 acquires a reference signal having sufficient receiving signal power by adding the reference signals received by the repetition. A communication channel estimation unit (path estimator) 112 calculates an estimated value of the communication channel characteristic (channel vector) using the integrated reference signal. This estimation value is used for demodulation processing by the demodulation unit 123 and for generating the replica signal.

The DS unit 120 includes the integration unit 121, a replica cancellation unit (replica canceller, replica remover) 122, the demodulation unit 123, a decoding unit (decoder) 124 and a replica generation unit (replica generator) 126. The integration unit 121 adds the data signals repeatedly transmitted for a number of times of repetition Nk (N number of slots) assigned to the target terminal 2 (terminal k), so as to increase the SNR of the received signals, and thereby the SINR is improved.

The replica cancellation unit 122 subtracts the replica signal, which was generated by the replica generation unit 126, from the integrated received signals (superimposed signals). The demodulation unit 123 separates the data signal of the target terminal 2 (terminal 2 of which transmitting power value is the maximum, out of the terminals which transmitted the superimposed signals) using an estimated value of the communication channel characteristic received from the communication channel estimation unit 112, and performs demodulation on the separated data signal. The decoding unit 124 decodes the data encoded by the encoding unit 221 of the terminal 2, and outputs the original data.

The replica generation unit 126 includes an encoding unit (encoder) 127, a modulation unit (modulator) 128 and a multiplication unit 129. The encoding unit 127 and the modulation unit 128 perform the encoding and digital modulation, which were performed in the terminal 2, on the data outputted from the decoding unit 124. The multiplication unit 129 multiplies the modulated data by the estimated value of the communication channel characteristic between the target terminal 2 (terminal 2 which transmitted the decoded data) and the base station 1. Thereby the replica signal is generated. The replica signal is supplied to the replica cancellation unit 122.

Calculation of Transmitting Power Based on Code Word Length

Figure 8:
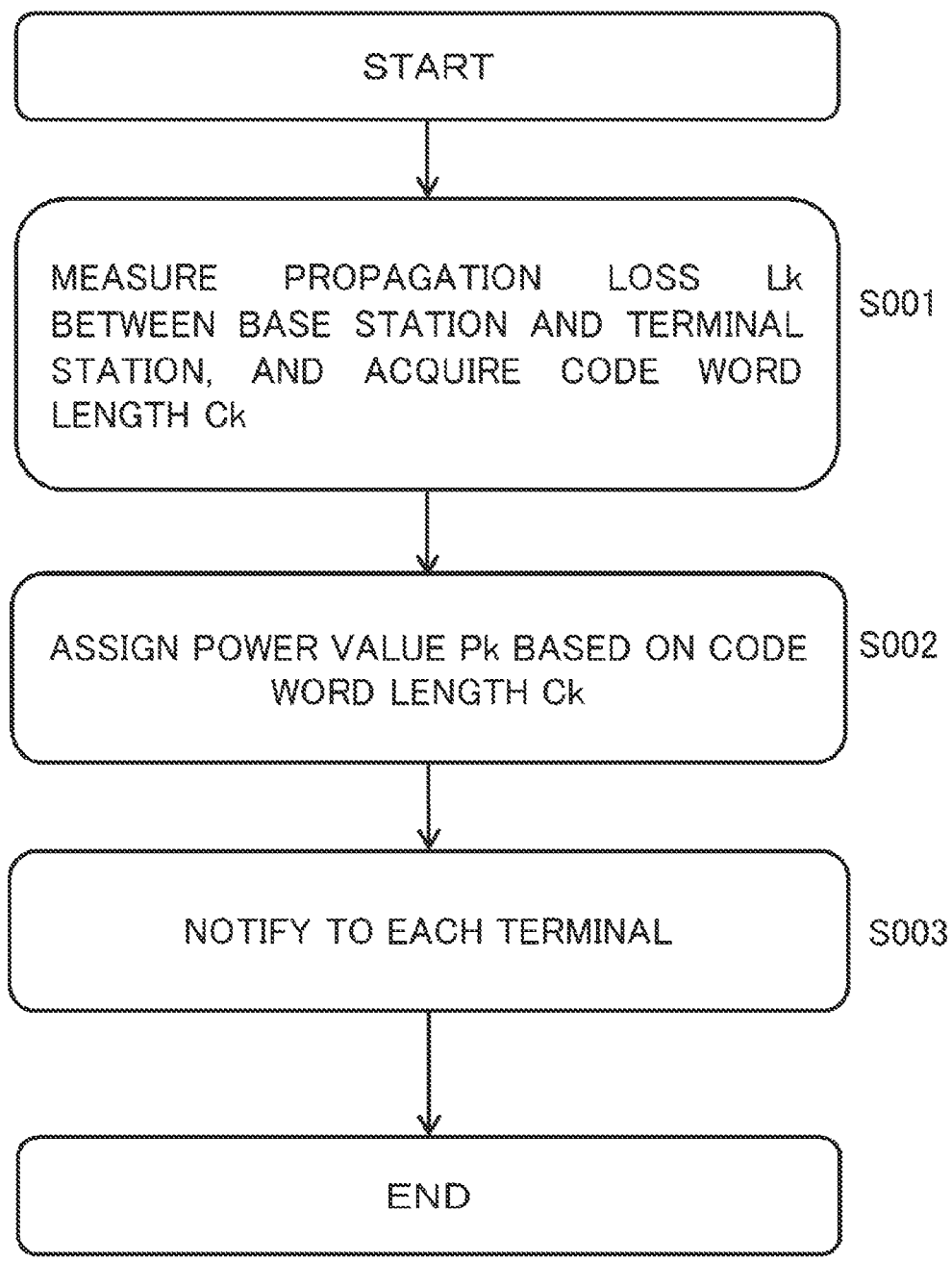
FIG. 8 is a flow chart depicting a processing example in the base station.

FIG. 8 is a flow chart depicting a processing example at the base station 1. The processing in FIG. 8 is performed by the processor 11 (control device 1b) of the base station 1, for example. This processing is performed in the case where a plurality of terminals 2 transmit data to the base station 1, and is started at a timing when the base station 1 received, via a UL control channel, a transmission request for the data signal, which was transmitted from the terminal 2, for example. The start trigger, however, is not limited to this. The input parameters to the processor 11 are as follows.

Terminal ID (user ID) k: k is a value in range from a minimum value "0" to a maximum value "K−1"

Maximum transmitting power $P_{max,UE}$: the allowable maximum value of the transmitting power that the terminal 2 can use Required power difference ΔP: receiving power difference between terminals at the base station, which is required to perform appropriate interference suppression and cancellation The input parameters are stored in the storage device 12, for example. However, the input parameters may be stored at a location other Than the storage device 12. Further, the processor 11 may acquire a part or all of the input parameters from a network.

In step S001, the processor 11 measures the propagation loss Lk between the base station 1 and each terminal 2, for K number of terminals 2 (terminal k: 0~K−1), which performs UL communication using NOMA. The processor 11 also acquires the code word length $C_k$ (used for data transmission) which is transmitted from each of the K number of terminals 2.

In step S002, the processor 11 assigns the transmitting power value $P_k$, based on the code word length $C_k$, to each of the K number of terminals 2. At the point when step S003 ends, the output parameter is as follows.

Transmitting power $P_k$ specified to each of the K number of terminals 2 (terminals having terminal ID: K=0 to K−1)

In step S003, the base station 1 transmits information including the output parameter to each of the plurality of terminals 2 via the DL control channel. At this time, in the information to be transmitted to the terminal 2, the base station 1 can include the information that indicates the number of times of repeat, the repeat starting slot and the frequency channel used for the repeat. This information may be transmitted to the terminal 2 using a means other than the DL control channel.

Figure 9:
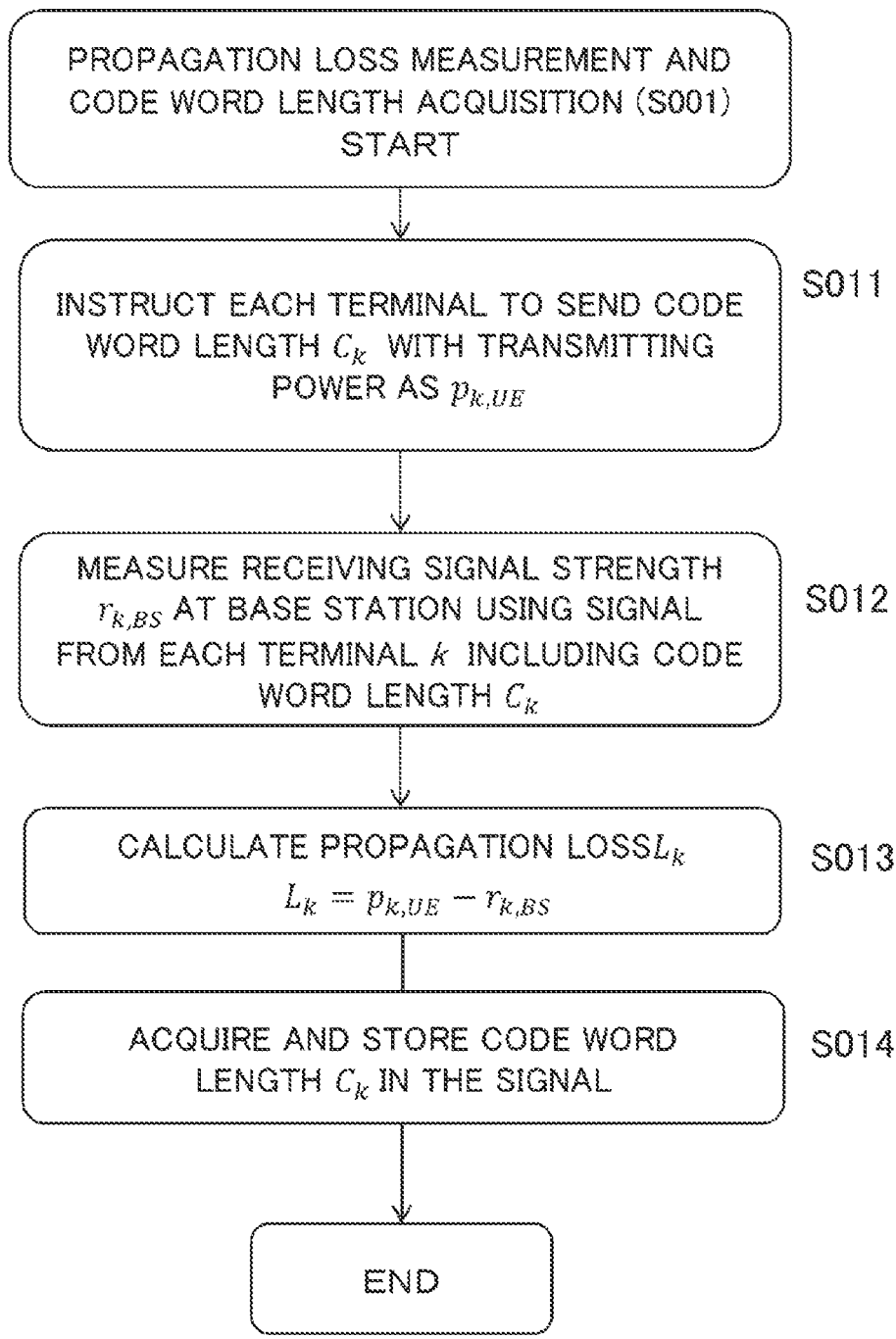
FIG. 9 is a flow chart exemplifying details of step S001 in FIG. 8.

FIG. 9 is a flow chart exemplifying details of step, S001 in FIG. 3. In step S011, the processor 11 instructs each terminal 2 to set the transmitting power in the transmitting power value $p_{k,UE}$, and to transmit a control signal. This instruction is transmitted via the DL control channel, for example.

In step S012, the processor 11 measures the received signal strength $r_{k,BS}$ of the control signal which each terminal 2 transmitted with the transmitting power value $p_{k,UE}$, in accordance with the above mentioned instruction. This control signal is transmitted via the UL control channel, for example.

In step S013, the processor 11 calculates the propagation loss $L_k$ between the terminal 2 and the base station 1 by subtracting the received signal strength $r_{k,BS}$ from the transmitting power value $p_{k,UE}$. In the case where the base station 1 includes a plurality of antennas 10, an average value of the propagation loss related to the received signal by each antenna 10 may be used as the propagation loss $L_k$ in step S013.

In step S014, the processor 11 acquires information (e.g. MCS) indicating the code word length $C_k$, which each terminal 2 uses for the repetition and is included in the control signal, and stores this information in the storage device 22 or the like.

Figure 10:
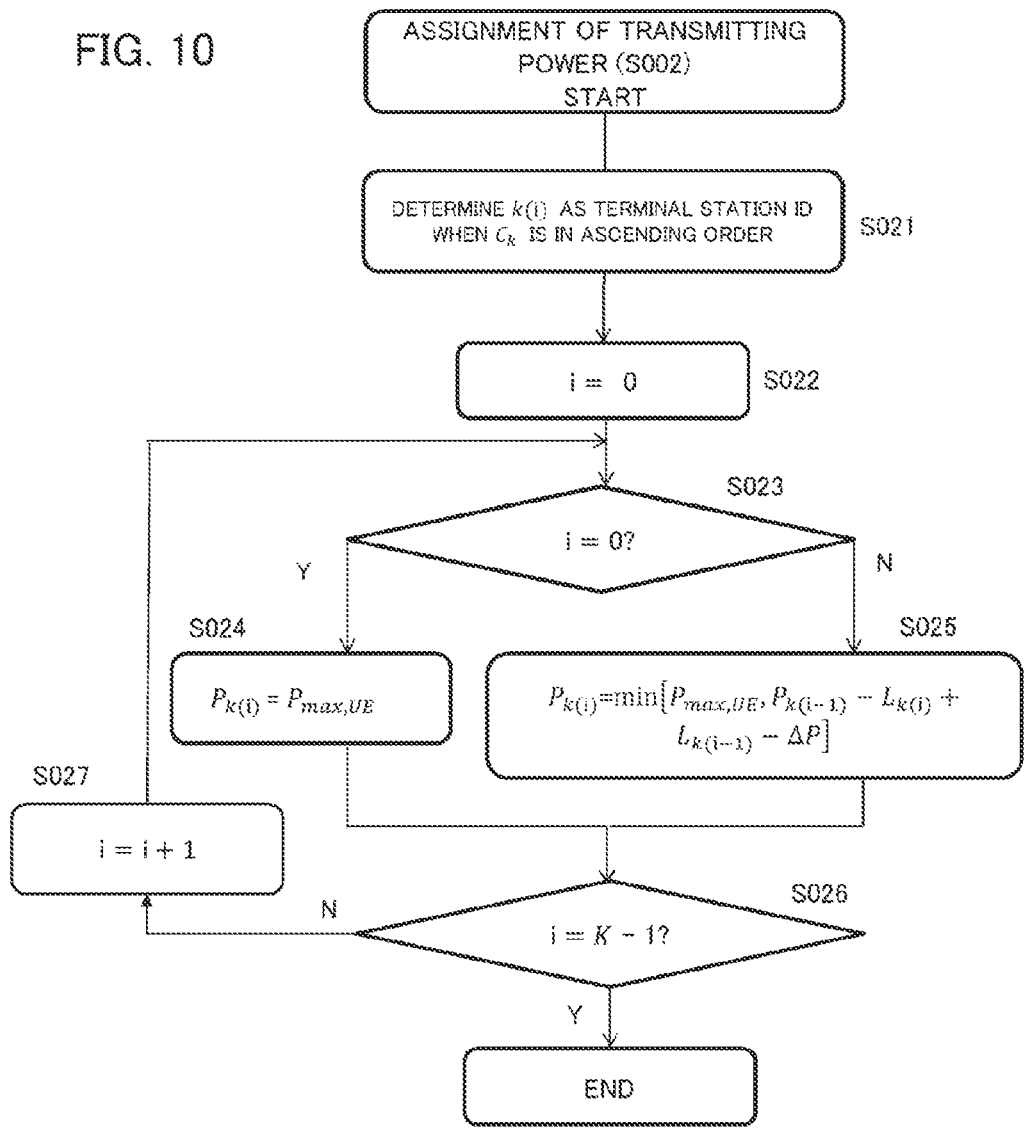
FIG. 10 is a flow chart depicting details of step S002 at FIG. 8.

FIG. 10 is a flow chart exemplifying details of the step S002 in FIG. 8. In step S021, the processor 11 determines k(i) as the terminal station ID when the code word length $C_k$ is in ascending order (in the order from the shorter length).

FIG. 11 is a flow chart for describing details of step S021. In step S031, the processor 11 arranges the K number of terminals 2 in ascending order of the shorter code word length $C_k$.

In step S032, the processor 11 determines whether there are terminals having a same rank of two or more (terminals having the same code word length) among the K number of terminals 2, in the result of arranging the terminals in ascending order of the shorter code word length Ck. In other words, the processor 11 determines whether the same code word lengths $C_k$ exit among the code word lengths $C_k$ of the K number of terminals 2. Processing advances to step S033 if it is determined that the same code word lengths exist, or processing advances to step S034 if not.

In step S033, the terminals in the same rank are arranged in ascending order of the propagation loss $L_k$. By increasing the rank of the terminal 2 of which propagation loss is smaller, the transmitting power is assigned such that the received power at the base station 1 becomes high, whereby the SNR can be improved.

In step S034, k(i), which is the terminal ID, is assigned to each of the terminals k which are ranked in the state where there are no same rank. k(i) is a function which decreases as the value of i increases. In other words, the value of k(i) becomes a smaller value as the rank based on the code word length is higher.

An example will be described below. It is assumed, for example, that there are four terminals k (k=0 to 3), and the values of the code word lengths Ck of these terminals k are as follows.

$C_0$5, $C_1$1, $C_2$=2, $C_3$=1

Further, it is assumed that the propagation loss Lk of each terminal k is as follows.

$L_0$=90, $L_1$=80, $L_2$=85, $L_3$=75

In the above example, the order based on $C_k$ is $C_1$=$C_3$, $C_2$ and $C_0$. Since $C_1$=$C_3$, the propagation loss L1 and the propagation loss $L_3$ thereof are compared. As a result, $C_3$, of which propagation loss is lower (loss is higher), is placed at a higher rank than $C_1$. Therefore the final order is $C_3$, $C_1$, $C_2$ and $C_0$. The value of k(i) of each terminal k=0 to 3 becomes as follows, for example.

k(i=0)=3, k(i=1)=1, k(i=2)=2, and k(i=3)=0

Referring back to FIG. 10, in step S022, the processor 11 sets the value of the argument 1 to 0. In step S023, the processor 11 determines whether the current value of 1 is 0 (minimum value of i). Processing advances to step S024 if it is determined that the value of 1 is 0, or processing advances to step S025 is not.

In step S021, the processor 11 sets the transmitting power value $P_{k(i)}$ to be assigned to the terminal k(i) to the maximum transmitting power $P_{max,UE}$. Thereby the transmitting power of the terminal k(0), that is of the terminal k=3, in the above example is set to the maximum transmitting power. Instead of the maximum transmitting power $P_{max,UE}$, a desired value lower than $P_{max,UE}$ may be used. Then processing advances to step S026.

In the case where processing advances to step S025, the processor 11 determines the transmitting power value $P_{k(i)}$ of the terminal k(1) to a smaller value out of the following first value and the second value.

First value: maximum transmitting power $P_{max,UE}$

Second value: a value determined by subtracting the difference between the propagation loss $L_{k(i)}$ and the propagation loss $L_{k(i-1)}$ and the required power difference $\Delta P$, from the power value $P_{k(i-1)}$ of the terminal k(i−1)

The second value becomes a value smaller than the first value. The second value becomes a value that is the required power difference $\Delta P$ or more, so that a sufficient power difference is acquired between terminals.

In step S026, the processor 11 determines whether the current value of i is K−1 (maximum value of i). The flow in FIG. 10 ends if it is determined that the value of i is K−1, or processing advances to step S027 if not. In step S027, the value of i is incremented (1 is added to the current value of i), and processing returns to step S023. In this way, the transmitting power value $P_{k(i)}$ is determined for each terminal k (i=1 to 3) indicated in the above mentioned example. Thereby the transmitting power is assigned to each terminal k, such that a power difference of at least the required power difference $\Delta P$ is ensured between the terminals k.

FIG. 12 is a diagram depicting an example of a modified repetition executed in the wireless communication system. When the processing steps related to the flow charts in FIGS. 8 to 13 are performed on the terminals 2 of which terminal IDs are "1" to "5" indicated in FIG. 4, the following operation is performed. That is, the terminals "1" to "5" are arranged in ascending order of the code word length $C_k$ (including adjustment based on the propagation loss $L_k$) (steps S031 to S033), then the initial power value is assigned to the terminals "1" to "5" respectively (steps S023 to S027). Therefore the order of the terminals "1" to "5" is changed to "3"→"4"→"2"→"1"→"5" in the order of the shorter code word length, and transmitting power is assigned sequentially in descending order. Thereby the receiving power at the base station becomes higher in this order, and becomes the state indicated in FIG. 13. Here, out of the terminals "1" to "5", the terminal "3", of which code word length is shortest, is ranked the highest. The code word length of the terminal "3" is the length of one slot, hence the delay required for demodulation and decoding of a signal from the terminal "3" is the length of one slot. In this way, according to the present embodiment, the minimum delay from the start of repetition at a same timing (repetition start slot) of the terminals "1" to "5" to the start of demodulation and decoding of the signal can be shortened. In other words, appropriate delay control can be performed on the terminal "3" that perform repetition. The terminal "3" has a short code word length, and can acquire an appropriate demodulation and decoding result (required block error rate (BLER)) quickly by setting a high transmitting power, whereby the repetition of the terminal "3" can be quickly stopped.

FIG. 13 is a diagram depicting an experiment example related to the repetition using the wireless communication system according to the present embodiment. The environment of the experiment example is as follows.

Inter-site distance (ISD): 1732 m
Non line-of-sight (NLOS) environment
Maximum transmitting power: 23 dBm
Number of antennas at base station 1: 2
Randomly select three types corresponding to MCS=1, 3, 5
Error correcting code: low density parity check (LDPC)

In the graph at the left side of FIG. 13, a plurality of user IDs (terminals 2) "1" to "6" are arranged in ascending order of the propagation loss. The ordinate of the graph is a number of slots that are required to start demodulation and decoding.

At the graph at the right side, on the other hand, the user IDs are arranged in ascending order of the code word length. (including the adjustment using propagation loss). In this case, the maximum transmitting power out of the plurality of terminals 2 that perform the repetition is assigned to the terminal 2 of which code word length is the shortest, hence the minimum delay required for demodulation and decoding of the signal from this terminal 2 is shortened. Thus appropriate delay control can be performed for the terminals 2 which perform repetition.

Functional Effect of Embodiment

The wireless communication system according to the present embodiment includes a plurality of transmitting stations (terminals 2) which are connected to the wireless communication partner receiving station (base station 1) by non-orthogonal multiple access (FIGS. 1A and 1B). Each of the plurality of terminals 2 can transmit a same signal to the base station 1 successively for a predetermined number of times at a predetermined cycle (number of slots) by the repetition (FIG. 4).

The information processing apparatus included in the base station 1, that is, a control device 1b including the processor 11, acquires information indicating a code word length for each of the plurality of terminals 2 to use for the repetition (S014 in FIG. 9). The processor 11 also assigns to each of the plurality of terminals 2, the transmitting power for ensuring a required power difference $\Delta P$ which is required between the terminals 2, so that the shorter the code word length the higher the received power at the base station. Thereby the maximum receiving power, among the plurality of terminals 2, is assigned to the terminal 2 of which code word length is shortest. Therefore the minimum delay (required number of slots) which is required to start demodulation and decoding of this terminal 2 can be shortened, compared with she case of assigning higher transmitting power as the propagation loss is larger. As a result, appropriate delay control can be performed for the terminals 2 which perform the repetition.

In the embodiment, the processor 11 or the control device 1b assigns the transmitting power to an least two terminals 2, which are included in the plurality of terminals 2 and have the same code word length, so that the higher the receiving quality (the smaller the propagation loss) at the base station 1 the higher the receiving power (S083 in FIG. 11, FIG. 10). By assigning the transmitting power so that the smaller the propagation loss of the terminal 2, the higher the receiving power at the base station, as described above, the reception quality (SINR or error rate) can be improved.

In the embodiment, the processor 11 or the control device 1b can acquire information that indicates the code word length which each of the plurality of terminals 2 transmitted to the base station 1. For example, as indicated in FIG. 9, the processor 11 or the control device 1b (base station 1) instructs the plurality of terminals 2 to transmit signals at a predetermined transmitting power (specified transmitting power) (S011). Then the processor 11 or the control device 1b can acquire information that indicates the code word length in the signal transmitted from each of the plurality of terminals 2 to the base station 1 in accordance with this instruction (S014).

In the embodiment, in accordance with the instruction, the processor 11 or the control device 1b can acquire the reception quality (propagation loss $L_k$) at the base station 1 of the signal transmitted to the base station 1. Thereby the acquisition of the code word length and the measurement of the propagation loss can be performed at the same time (efficiently). However, the acquisition of the code word length and the measurement of the propagation loss may be performed independently.

In the embodiment, the processor 11 or the control device 1b may perform the following steps. That is, the processor or the control device 1b determines the ranks of the plurality of terminals 2, so that the shorter the code word length the higher the rank (FIG. 11). Further, in the assignment of the transmitting power, the processor 11 or the control device 1b assigns the maximum transmitting power ($P_{max,UE}$) that is assignable, to the terminal k(0) of which rank is the highest among the plurality of terminals 2 so that the received power at the base station becomes maximum. Then the processor 11 or the control device 1b calculates the transmitting power that is assigned to each of the terminals other than the terminal k(0) at the highest rank, so that the required power difference ΔP of the receiving power at the base station is ensured, in a range of power that is lower than $P_{max,UE}$ (S025 in FIG. 10). Thereby a power difference appropriate for SIC can be provided to each terminal 2, and the level of transmitting power that can improve the SINR can be assigned to each terminal 2 of which rank is second or less.

In the embodiment, the processor 11 or the control device 1b can transmit information, which includes the transmitting power assigned to the plurality of terminals 2, to the plurality of terminals 2. This information can be transmitted via UL control channel or the like (S003 in FIG. 8). The terminal 2 receives this information and can set the transmitting power used for the repetition. The terminal 2 may receive information which indicates a number of times of repetition, a repetition start timing and a frequency channel to be used, along with the information which indicates the transmitting power.

In the embodiment, each of the plurality of terminals 2 that perform the repetition is an example of the "first transmitting station", and the terminals 2 can receive information that indicates the transmitting power which is assigned to the plurality of terminals 2, so that the shorter the code word length of the terminal 2 the higher the receiving power at the base station 1.

The terminal 2 can also execute: receiving an instruction from the base station 1, including the information indicating the code word length used for the repetition in the signal; and transmitting the signal in accordance with the instruction to the base station 1. At this time, the terminal 2 can transmit the signal in accordance with the instruction at the transmitting power specified by the base station 1.

The processing and means described in the present disclosure may be freely combined and used as long as technical inconsistency is not generated. A processing step which was described based on the assumption that one device executes that step may be shared by a plurality of devices. Further, a processing step which was described based on the assumption that difference devices execute that step may be executed by one device. In the computer system, a kind of hardware configuration (server configuration) that implements each function may be freely changed.

The present disclosure may also be implemented by supplying a computer program storing the functions described in the above embodiment to a computer, and one or more processors included in the computer reading and executing the program. This computer program may be provided to the computer by a non-transitory computer-readable storage medium that can be connected to the system bus of the computer, or may be provided to the computer via a network. The non-transitory computer-readable storage medium is an arbitrary type of disk, such as a magnetic disk (e.g. floppy (registered trademark) disk, hard disk drive (HDD)) and an optical disk (e.g. CD-ROM, DVD disk, Blu-ray disk), a read only memory (ROM), a random access memory (RAM), an EPROM, an EEPROM, a magnetic card, a flash memory, an optical card, and an arbitrary type of medium suitable for storing electronic instructions.

What is claimed is:

1. A transmission control method for a plurality of transmitting stations connected to a wireless communication partner receiving station by non-orthogonal multiple access, each of the plurality of transmitting stations being capable of transmitting a same signal to the receiving station by repetition for a predetermined number of times at a predetermined cycle, the transmission control method comprising:
    acquiring, by an information processing apparatus, information indicating a code word length for each of the plurality of transmitting stations to use for the repetition; and
    assigning, by the information processing apparatus, to each of the plurality of transmitting stations, transmitting power for ensuring a receiving power difference at the receiving station which is required between the plurality of transmitting stations, the transmitting power being assigned such that the shorter the code word length the higher the receiving power at the receiving station.

2. The transmission control method according to claim 1, further comprising: assigning, by the information processing apparatus, transmitting power to at least two transmitting stations of the plurality of transmitting stations, the at least two transmitting stations having the same code word length, such that that the higher the reception quality at the receiving station the higher the receiving power at the receiving station.

3. The transmission control method according to claim 1, further comprising: acquiring, by the information processing apparatus, information indicating the code word length, which is transmitted from each of the plurality of transmitting stations to the receiving station.

4. The transmission control method according to claim 1, further comprising:
    instructing, by the information processing apparatus, the plurality of transmitting stations to transmit one or more signals at a predetermined transmitting power, and
    acquiring, by the information processing apparatus, information indicating the code word length included in the one or more signals, which is transmitted from the plurality of transmitting stations to the receiving station in accordance with the instructing.

5. The transmission control method according to claim 4, further comprising: acquiring, by the information processing apparatus, a reception quality at the receiving station of the one or more signals transmitted to the receiving station.

6. The transmission control method according to claim 1, further comprising:
   determining, by the information processing apparatus, ranks of the plurality of transmitting stations such that the shorter the code word length the higher the rank, and
   assigning, by the information processing apparatus, a maximum transmitting power to a transmitting station having a highest rank among the plurality of transmitting stations, and
   calculating, by the information processing apparatus, a transmitting power assigned to each of the plurality of transmitting stations other than the transmitting station having the highest rank, such that the receiving power difference at the receiving station is ensured in a range of power that is lower than the maximum transmitting power.

7. The transmission control method according to claim 1, further comprising: transmitting, by the information processing apparatus, to the plurality of transmitting stations, information including the transmitting power assigned to each of the plurality of transmitting stations.

8. An information processing apparatus configured to control transmission for a plurality of transmitting stations connected to a wireless communication partner receiving station by non-orthogonal multiple access, each of the plurality of transmitting stations being capable of transmitting a same signal to the receiving station by repetition for a predetermined number of times at a predetermined cycle, the information processing apparatus comprising
   a controller, the controller being configured to:
   acquire information indicating a code word length for each of the plurality of transmitting stations to use for the repetition; and
   assign, to each of the plurality of transmitting stations, transmitting power for ensuring a receiving power difference at the receiving station which is required between the plurality of transmitting stations, the transmitting power being assigned such that the shorter the code word length the higher the receiving power at the receiving station.

9. The information processing apparatus according to claim 8, wherein the controller is configured to assign transmitting power to at least two transmitting stations of the plurality of transmitting stations, the at least two transmitting stations having the same code word length, such that the higher the reception quality at the receiving station the higher the receiving power at the receiving station.

10. The information processing apparatus according to claim 8, wherein the controller is configured to acquire information indicating the code word length, which is transmitted from each of the plurality of transmitting stations to the receiving station.

11. The information processing apparatus according to claim 8, wherein the controller is configured to:
   instruct the plurality of transmitting stations to transmit one or more signals at a predetermined transmitting power, and
   acquire information indicating the code word length included in the one or more signals, which is transmitted from the plurality of transmitting stations to the receiving station in accordance with an instruction.

12. The information processing apparatus according to claim 11, wherein the controller is configured to:
   acquire a reception quality at the receiving station of the one or more signals transmitted to the receiving station.

13. The information processing apparatus according to claim 8, wherein the controller is configured to:
   determine ranks of the plurality of transmitting stations such that the shorter the code word length the higher the rank;
   assign maximum transmitting power to a transmitting station having a highest rank among the plurality of transmitting stations; and
   calculate transmitting power assigned to each of the plurality of transmitting stations other than the transmitting station having the highest rank, such that the receiving power difference at the receiving station is ensured in a range of power that is lower than the maximum transmitting power.

14. The information processing apparatus according to claim 8, wherein the controller is configured to:
   transmit, to the plurality of transmitting stations, information including the transmitting power assigned to each of the plurality of transmitting stations.

15. The information processing apparatus according to claim 8, wherein the information processing apparatus is included in the receiving station.

16. A transmission control method for a first transmitting station of a plurality of transmitting stations, the plurality of transmitting stations being connected to a wireless communication partner receiving station by non-orthogonal multiple access, and each of the plurality of transmitting stations being capable of transmitting a same signal to the receiving station by repetition for a predetermined number of times at a predetermined cycle, the method comprising:
   transmitting, to the receiving station, a code word length used for the repetition;
   receiving information indicating a transmitting power assigned based on the code word length to be used for the repetition; and
   performing the repetition using the transmitting power.

17. The transmission control method according to claim 16, further comprising:
   receiving the information indicating transmitting power assigned to each of the plurality of transmitting stations, the transmitting power being assigned such that the shorter the code word length the higher the receiving power at the receiving station.

18. The transmission control method according to claim 16, further comprising:
   receiving an instruction from the receiving station;
   including the information indicating the code word length used for the repetition in a signal in accordance with the instruction; and
   transmitting, to the receiving station, the signal in accordance with the instruction.

19. The transmission control method according to claim 18, further comprising:
   transmitting the signal in accordance with the instruction with the transmitting power specified by the receiving station.

20. The transmission control method according to claim 16, further comprising:
   receiving information indicating a start timing of the repetition, a frequency channel used for the repetition, and a number of times of the repetition.

* * * * *